(12) United States Patent
Eckert et al.

(10) Patent No.: US 11,084,470 B2
(45) Date of Patent: Aug. 10, 2021

(54) METHOD FOR REGULATING A VEHICLE-ACTUAL-DECELERATION IN A VEHICLE WITH AN ABS BRAKE SYSTEM

(71) Applicant: WABCO GmbH, Hannover (DE)

(72) Inventors: Horst Eckert, Rehburg-Loccum (DE); Florian Schwagmeyer, Heuerssen (DE)

(73) Assignee: ZF CV SYSTEMS HANNOVER GMBH, Hannover (DE)

( * ) Notice: Subject to any disclaimer, the term of this patent is extended or adjusted under 35 U.S.C. 154(b) by 181 days.

(21) Appl. No.: 16/060,032

(22) PCT Filed: Nov. 9, 2016

(86) PCT No.: PCT/EP2016/001852
§ 371 (c)(1),
(2) Date: Jun. 7, 2018

(87) PCT Pub. No.: WO2017/108148
PCT Pub. Date: Jun. 29, 2017

(65) Prior Publication Data
US 2018/0370507 A1    Dec. 27, 2018

(30) Foreign Application Priority Data

Dec. 22, 2015 (DE) .......................... 102015016721.9

(51) Int. Cl.
| | |
|---|---|
| *B60T 8/1761* | (2006.01) |
| *B60T 13/66* | (2006.01) |
| *B60T 13/68* | (2006.01) |
| *B60T 8/26* | (2006.01) |
| *B60T 8/36* | (2006.01) |

(Continued)

(52) U.S. Cl.
CPC ............ *B60T 8/1761* (2013.01); *B60T 8/171* (2013.01); *B60T 8/1755* (2013.01);
(Continued)

(58) Field of Classification Search
CPC ...... B60T 8/1755; B60T 8/1761; B60T 8/176; B60T 8/17; B60T 8/17616; B60T 8/172; B60T 13/66; B60T 13/662; B60T 13/68; B60T 13/683; B60T 13/686
See application file for complete search history.

(56) References Cited

U.S. PATENT DOCUMENTS 5,136,509 A * 8/1992 van Zanten ......... B60T 8/17616
180/197
5,443,307 A * 8/1995 Maier .................... B60T 8/175
303/169

(Continued)

FOREIGN PATENT DOCUMENTS

| DE | 4030724 A1 | 4/1992 |
| DE | 19615305 A1 | 10/1997 |

(Continued)

*Primary Examiner* — Robert A. Siconolfi
*Assistant Examiner* — Stephen M Bowes
(74) *Attorney, Agent, or Firm* — Leydig, Voit & Mayer, Ltd.

(57) ABSTRACT

A method for regulating a vehicle-actual-deceleration in a vehicle with an ABS brake system includes detecting the vehicle-actual-deceleration; determining a target vehicle deceleration and detecting at least one actual wheel rotational behavior. The method further includes calculating actuation times for actuation of pressure control valves of the ABS brake system associated with the wheels of the first vehicle axle and the wheels of the further vehicle axle and determining correction actuation times if at least one of the respective calculated actuation times is less than a minimum actuation time associated with the respective pressure control valve. Calculation of each of the respective actuation times is carried out at least for all of a first number of pressure control valves with which wheels are associated whose rotational behavior follows the at least one actual wheel rotational behavior.

17 Claims, 3 Drawing Sheets

(51) Int. Cl.
*B60T 8/1766* (2006.01)
*B60T 8/1755* (2006.01)
*B60T 8/1763* (2006.01)
*B60T 8/171* (2006.01)
*B60T 8/72* (2006.01)
*B60T 8/24* (2006.01)
*B60T 8/48* (2006.01)

(52) U.S. Cl.
CPC ........ *B60T 8/1766* (2013.01); *B60T 8/17636* (2013.01); *B60T 8/268* (2013.01); *B60T 8/36* (2013.01); *B60T 8/361* (2013.01); *B60T 8/72* (2013.01); *B60T 13/662* (2013.01); *B60T 13/683* (2013.01); *B60T 8/243* (2013.01); *B60T 8/4818* (2013.01)

(56) References Cited

U.S. PATENT DOCUMENTS

| | | | |
|---|---|---|---|
| 5,732,378 A | 3/1998 | Eckert et al. | |
| 5,863,105 A * | 1/1999 | Sano | B60T 8/17552 303/140 |
| 6,000,765 A | 12/1999 | Hinz et al. | |
| 6,061,620 A | 5/2000 | Wuerth et al. | |
| 6,238,020 B1 * | 5/2001 | Gronau | B60T 8/17616 303/158 |
| 2002/0099488 A1 | 7/2002 | Brachert | |
| 2002/0135229 A1 * | 9/2002 | Ohtsu | B60T 8/17616 303/156 |
| 2004/0012252 A1 | 1/2004 | Meyer et al. | |
| 2009/0306872 A1 * | 12/2009 | Joyce | B60T 8/17616 701/76 |
| 2010/0017088 A1 * | 1/2010 | Joyce | B60T 8/172 701/73 |
| 2012/0215414 A1 * | 8/2012 | Watanabe | B60T 13/686 701/70 |

FOREIGN PATENT DOCUMENTS

| | | |
|---|---|---|
| DE | 19647997 A1 | 5/1998 |
| DE | 10053606 A1 | 5/2002 |
| DE | 10232792 A1 | 2/2004 |
| DE | 102008057529 A1 | 5/2010 |
| EP | 1104731 A2 | 6/2001 |

* cited by examiner

METHOD FOR REGULATING A VEHICLE-ACTUAL-DECELERATION IN A VEHICLE WITH AN ABS BRAKE SYSTEM

CROSS REFERENCE TO RELATED APPLICATIONS

This application is a U.S. National Stage Application under 35 U.S.C. § 371 of International Application No. PCT/EP2016/001852 filed on Nov. 9, 2016, and claims benefit to German Patent Application No. DE 10 2015 016 721.9 filed on Dec. 22, 2015. The International Application was published in German on Jun. 29, 2017 as WO 2017/108148 A1 under PCT Article 21 (2).

FIELD

The invention concerns a method for regulating a vehicle-actual-deceleration in a vehicle, in particular a utility vehicle, with an ABS brake system and a control device for carrying out such a method.

BACKGROUND

Pressure control valves are, for example, used as ABS control valves in an ABS brake system to be able to adjust a pressure difference on wheel brakes of a vehicle, in particular a utility vehicle, once the occurrence of brake slip has been detected. In this case, a pressure control valve or an ABS control valve comprises an inlet valve and an outlet valve, each of which is embodied as a 2/2-way solenoid valve. Depending on the actuation, which is carried out in a clocked or pulsed manner, the inlet valve or the outlet valve is in an open or in a closed state, so that with suitable actuation a brake pressure on the respective wheel brakes can either be increased, maintained or reduced, wherein for this purpose a defined reservoir pressure from reservoir containers is provided at the input of the ABS control valves.

However, an ABS control valve of this type can also be used for regulating a vehicle-actual-deceleration by the ABS brake system if a demanded brake pressure or a brake pressure difference is specified by an arbitrary driver assistance system or a stability control system, for example a stability program (ESP), an automatic cruise control system (ACC), a rollover prevention controller (RSC), an emergency braking system (AEBS), an antislip regulation system (ASR) or a yaw rate controller (YC). In addition or alternatively, in the case of driver braking, the brake pressure or a brake pressure difference on individual wheel brakes can be specified by a brake pressure distributor (EBD) or a brake force limiter (EBL) and controlled by the ABS control valve.

Furthermore, with regulation of the vehicle-actual-deceleration of this type, a difference in the wheel rotational behavior between two vehicle axles can be taken into account, wherein from this the extent to which a vehicle axle is overbraked or underbraked in relation to a further vehicle axle can be derived. In this case, the wheel rotational behavior is characterized by brake slip or a rotation rate or an angular speed of the wheels of the individual vehicle axles. By actuating the corresponding ABS control valves, this overbraking or underbraking can be avoided.

The actuation of the pressure control valve or the ABS control valve is carried out in this case by means of a control device, which actuates, i.e. opens or closes, the inlet valve and/or the outlet valve of the respective pressure control valve over defined actuation times. The actuation times determine the pressure difference that is set on the respective wheel brakes via the pressure control valve. Depending on whether the outlet valve and/or the inlet valve is/are actuated, thus the brake pressure on the wheel brakes is reduced or increased by the pressure difference or the brake pressure is maintained, so that a vehicle-actual-deceleration, a difference in the wheel rotational behavior of the wheels and/or a brake slip can be adjusted accordingly by this means. The relationship between the actuation time and the specified pressure difference is based here on a previously empirically defined pressure difference characteristic, both for the inlet valve and also for the outlet valve.

If there is a braking demand from a driver assistance system, then the pressure control valves on the wheels of the corresponding vehicle axles of the vehicle are actuated by the control device. In the case of actuation of this type, it is additionally taken into account that a minimum actuation time associated with the respective pressure control valve is observed, with which the pressure control valve at least is to be actuated, wherein the minimum actuation time arises in particular from safety-relevant considerations, according to which each pressure control valve comprises dead times or reaction times and tolerance times, which inter alia are dependent on the temperature of the pressure control valve and during which no effective pressure control is carried out.

It is disadvantageous here that in the event of braking being demanded with a target vehicle deceleration, first a simultaneous actuation of all pressure control valves is carried out at least over the minimum actuation time, even if in certain situations, for example in the event of a low braking demand, a pressure difference corresponding to the minimum actuation time on the corresponding pressure control valves is actually not necessary to set the target vehicle deceleration. This results in the brake pressure on the individual pressure control valves being adjusted again in a downstream control loop, which is perceived by the driver as negative. The actual braking aim, the target vehicle deceleration, is thus only actually achieved after unnecessary readjustment. The regulation is carried out very coarsely and inaccurately as a result, at least for small braking demands or for small time-dependent changes in braking demands, for example in the event of braking with a profile of the target vehicle deceleration on a ramp, i.e. for example when braking with a ramp profile of the target vehicle deceleration, permanently occurring excessive control errors occur. On the other hand, a loss of stability, i.e. in particular a case of ABS brake slip, can occur owing to the unnecessary and abrupt deceleration or owing to the coarse regulation of the vehicle-actual-deceleration from timing cycle to timing cycle. Thus, in particular safety-critical situations can also arise during braking that reduce the ride comfort and safety during braking of the vehicle.

In DE 10 2008 057 529 A1, a method for operating a brake system with a regenerative wheel brake is described, with which it is provided to actuate wheel brakes of the vehicle implemented as friction brakes in such a way that a differential slip characterizing the difference in the wheel rotational behavior between the front wheels of the front axle and the rear wheels of the rear axle remains within a specified target interval for the differential slip. For this purpose, only wheel brakes on the rear axle are actuated, wherein first a regenerative wheel brake is actuated with a maximum possible braking power. If this is not sufficient to reduce the differential slip to almost zero, braking by a further rear axle wheel brake is applied in addition. In this case, the rear axle wheel brake is actuated at the same time as the regenerative wheel brake, wherein actuation of the rear axle wheel brake is only carried out with a response pressure that does not bring about braking, so that increasing above the response pressure directly results in braking of the rear axle wheel brake without dead times. As a result, the response time of the rear axle wheel brake should be reduced. If the differential slip is within the target interval, the front axle wheel brake can also be actuated.

In DE 102 32 792 A1, a braking method for a vehicle is described, with which during driver assistance braking by means of an ACC or a RSC, only the driven vehicle axles are decelerated by providing an increased reservoir pressure to the ABS brake valves, which is delivered to the wheel brakes by briefly opening the ABS brake valves to a suitable extent and closing them again.

EP 1 104 731 A2 describes decelerating a vehicle with an ABS brake system in such a way that an actual vehicle-actual-deceleration is adjusted to a specified target vehicle deceleration, wherein on detecting a deviation the braking force on a rear axle is automatically increased in such a way that a differential slip between the front axle and the rear axle is approximately zero, i.e. the brake slip on the rear axle corresponds to the brake slip on the front axle.

SUMMARY

In an embodiment, the present invention provides a method for regulating a vehicle-actual-deceleration (zIst) in a vehicle with an ABS brake system. The method includes detecting the vehicle-actual-deceleration; determining a target vehicle deceleration; and detecting at least one actual wheel rotational behavior. The actual wheel rotational behavior indicates a difference in a rotational behavior of wheels of a first vehicle axle from wheels of a further vehicle axle. The method further includes calculating actuation times for actuation of pressure control valves of the ABS brake system associated with the wheels of the first vehicle axle and the wheels of the further vehicle axle. Each of the respective actuation times indicates a time at which a respective one of the pressure control valves is to be actuated to adjust the vehicle-actual-deceleration to the target vehicle deceleration and the at least one actual wheel rotational behavior to a respective target wheel rotational behavior. Moreover the method includes determining correction actuation times if at least one of the respective calculated actuation times is less than a minimum actuation time associated with the respective pressure control valve. Calculation of each of the respective actuation times is carried out at least for all of a first number of pressure control valves with which wheels are associated whose rotational behavior follows the at least one actual wheel rotational behavior. When undershooting at least one minimum actuation time, correction actuation times are calculated for a second number of pressure control valves, wherein the second number is smaller than the first number, and to bring about the target vehicle deceleration actuation is only carried out of the pressure control valves with an associated correction actuation time, so that the smaller number of actuated pressure control valves resulting from undershooting at least one minimum actuation time is compensated by the correction actuation times.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
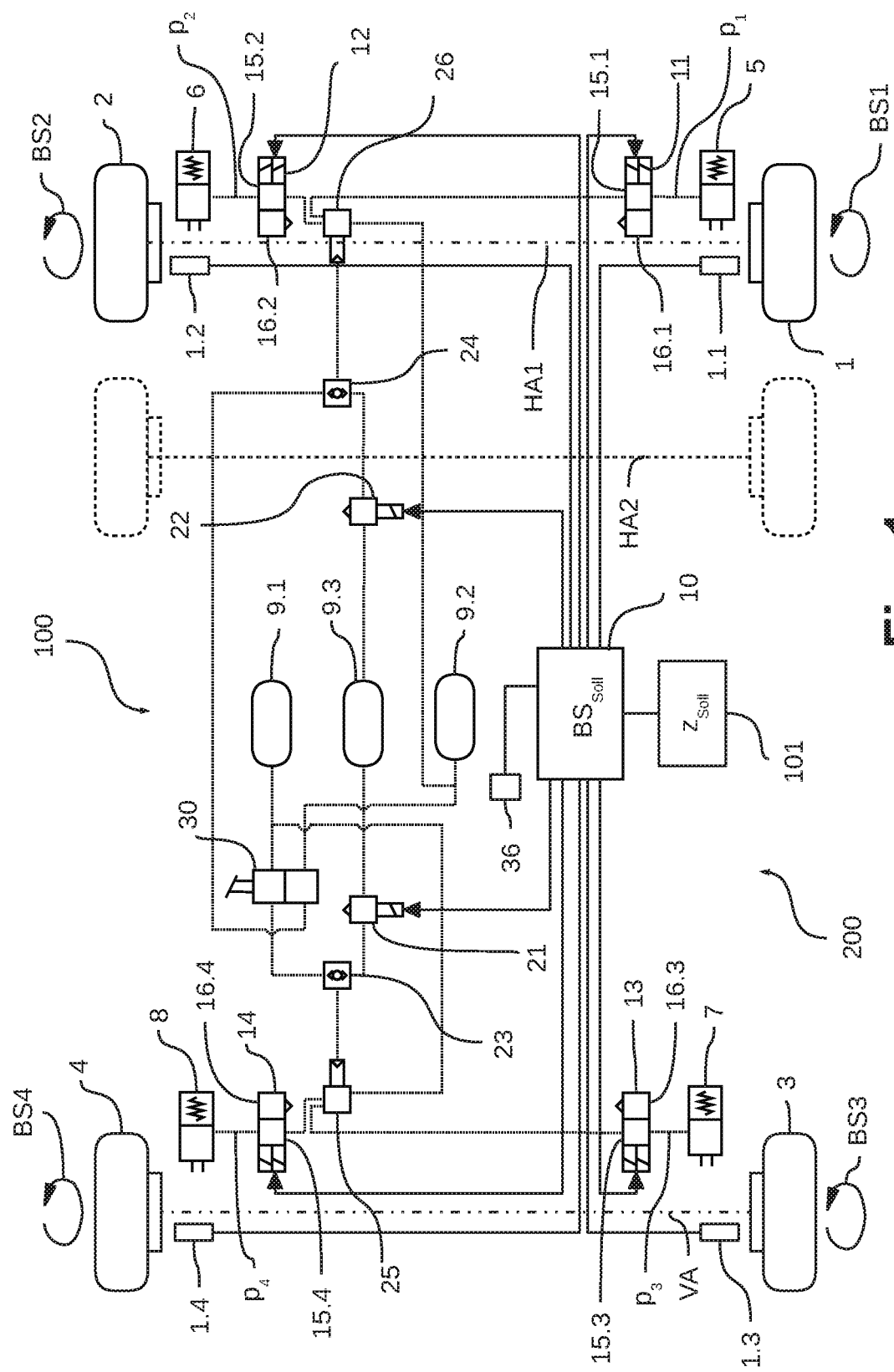
FIG. 1 shows a utility vehicle with an ABS brake system.

Embodiments of the invention provide a method for regulating a vehicle-actual-deceleration in a vehicle, in particular a utility vehicle, with which reliable and safe braking of the vehicle can be achieved. Further embodiments of the invention provide a control device configured to carry out such a method.

According to embodiments of the invention, regulating a vehicle-actual-deceleration in a vehicle is achieved by recalculating the actuation times in the event of a calculated actuation time for a pressure control valve undershooting below a minimum actuation time associated with this pressure control valve, wherein a smaller number of pressure control valves is used as a basis for this recalculation of the actuation times than with the original calculation of the actuation times. Therefore, if there is a braking demand or a target vehicle deceleration is demanded, which can also result from a change in the braking demand between two timing cycles or actuation cycles, for example in the case of essentially ramp-shaped demanded braking, for which there are different target vehicle decelerations between two successive timing cycles that follow the ramp, actuation times for a first number of pressure control valves of the vehicle, which is for example the number of all pressure control valves available for regulation in the vehicle, are calculated in a first calculation step to set the specified target vehicle deceleration with this first number of pressure control valves. If it is then determined that at least one of the calculated actuation times for a pressure control valve undershoots a minimum actuation time associated with this pressure control valve, a recalculation of the actuation times is carried out in a second calculation step, wherein correction actuation times recalculated for this purpose for a second number of pressure control valves, which is a true subset of the first number of pressure control valves, are determined, i.e. the second number of pressure control valves is therefore smaller than the first number.

The correction actuation times thus indicate how long the respective pressure control valves are to be actuated for so that the target vehicle deceleration is enforced by this reduced number of pressure control valves, wherein according to embodiments of the invention at the same time an actual wheel rotational behavior between wheels of two axles is set to a desired or specified target wheel rotational behavior, i.e., according to embodiments of the invention the loss of braking effect owing to the omitted pressure control valves, i.e. the first number minus the second number, is compensated by the correction actuation times.

As a result, it can advantageously already be achieved that the actuation times of the pressure control valves to be actuated can be approximated to or can also exceed the minimum actuation time of the respective pressure control valves as a result. Because in total fewer pressure control valves are actuated to achieve the same target vehicle deceleration, the (corrected) actuation times increase automatically, because the lack of braking effect is compensated as a result. Therefore, braking can be carried out more accurately, because the specified target vehicle deceleration at the start of braking or during braking with a ramp-shaped profile as a function of time of the target vehicle deceleration by a process of the actuation of one or more pressure control valves is exceeded to a lesser extent or is no longer exceeded, and thus as a result has to be readjusted to a lesser extent to set the actually demanded target vehicle deceleration. In the case of a time-dependent ramp-shaped profile of the target vehicle deceleration, regulation in smaller steps can thus be achieved, because it is possible, despite maintaining the required minimum actuation time of a pressure control valve, to carry out adjustment of the vehicle-actual-deceleration to the required target vehicle deceleration while at the same time setting a desired wheel rotational behavior, which causes a smaller control error. As a result, the safety of a braking process and the comfort of braking also increase, because the probability reduces of a case of ABS brake slip because of an excessively abrupt or coarse deceleration or deceleration process on individual wheels.

In this case, the pressure control valves are ABS control valves in ABS brake systems for example, wherein the ABS pressure control system is superimposed on a method according to one or more embodiments of the invention, and on detecting braking slip on at least one wheel, the pressure control valves or the ABS control valves are actuated in such a way that locking of the wheels is counteracted. Regardless of the situation at the pressure control valves in respect of the minimum actuation time, in the case of ABS brake slip actuation of the respectively involved pressure control valve always takes place to prevent locking of the respective wheel. The calculations preferably take place in a control device of the ABS brake systems, in which for example software is provided that is designed to carry out the corresponding calculation steps. The control device can however also be disposed externally and can access corresponding information from the ABS brake system to be able to carry out the calculation steps.

The calculations of the actuation times or the correction actuation times in the first and in the second calculation step are each carried out during this in such a way that an actually present vehicle-actual-deceleration, i.e. a vehicle-acceleration, is adjusted to the specified target vehicle deceleration. The specification of the target vehicle deceleration is carried out only in the event of braking because of an external braking demand of a driver assistance system or a stability control system solely by the driver assistance system or the stability control system. In the case of combined braking from an external braking demand and driver braking on the other hand, specification of the target vehicle deceleration is carried out based on both demands, wherein the resulting demand is determined from both demands in an addition process or a maximum process.

As driver assistance systems or stability control systems, for example a stability program (ESP), an automatic cruise control system (ACC), a rollover prevention system (RSC), an emergency braking system (AEBS) or a yaw rate controller (YC) are considered. In addition or alternatively, during driver braking the brake pressure or a brake pressure difference on individual wheel brakes can be specified by a brake pressure distributor (EBD) or a brake force limiter (EBL) and controlled via the pressure control valve.

At the same time, a calculation of the actuation times is carried out depending on at least one actual wheel rotational behavior, wherein the actual wheel rotational behavior is characterized by a currently available difference in a brake slip or a rotation rate or an angular speed of wheels of a first vehicle axle, for example a front axle, from wheels of a further vehicle axle, for example a rear axle. The actual wheel rotational behavior thus indicates the extent to which the first vehicle axle or individual wheels of the first vehicle axle are overbraked or underbraked in relation to the further vehicle axle or individual wheels of the further vehicle axle. Here overbraking means that the wheels of the first vehicle axle are turning slower relative to the wheels of the further vehicle axle, i.e. in particular have more brake slip, whereas underbraking means that the wheels of the first vehicle axle have less brake slip than the wheels of the further vehicle axle, i.e. are turning faster.

For measuring the wheel rotational behavior on the wheels, with which a pressure control valve is associated, for example ABS wheel sensors or revolution rate sensors provided in the ABS brake system are used, which can measure a wheel revolution rate of the respective wheel in order to be able to determine the wheel rotational behavior from this, for example using the angular speed of the wheel, i.e. in particular to determine wheel slip per axle or a differential slip. The wheel rotational behavior is permanently monitored in this case, so that the wheel slip can be continuously determined from the wheel revolution rates of the corresponding wheels and the differential slip can be continuously determined from this and can be suitably adjusted by actuation of the pressure control valves.

The actual wheel rotational behavior is approximated during this by a suitable calculation of the actuation times for a specified target wheel rotational behavior. Thus, it is provided to adjust the tendency to locking of the first vehicle axle to the tendency to locking of the further vehicle axle. It can also be provided to consider more than one actual wheel rotational behavior, for example in addition the difference in the wheel rotational behavior between the front axle and a second rear axle.

The calculated actuation times and the correction actuation times are thus calculated in the first and in the second calculation steps for the respective pressure control valve in such a way that both the vehicle-actual-deceleration is regulated to the target vehicle deceleration and the at least one actual wheel rotational behavior is regulated to the respective target wheel rotational behavior, wherein both calculation steps only differ in that they are based on a different number of pressure control valves. If a minimum actuation time has been undershot, to implement the braking demand within the scope of a method according to one or more embodiments of the invention actuation is carried out only of those pressure control valves for which a correction actuation time has been calculated. All other pressure control valves do not contribute to the braking, because these are not taken into account during calculation of the correction actuation times, i.e., the target vehicle deceleration is only implemented by the second number of pressure control valves or wheel brakes associated with the respective pressure control valves.

In order to further improve accuracy and reliability during braking on undershooting the minimum actuation time, it is preferably provided to reduce the second number of pressure control valves as much as possible, so that the correction actuation time can be approximated as closely as possible to the respective minimum actuation time and this may even be exceeded. For this purpose, case discrimination may advantageously be provided:

If the calculated actuation times of all the considered pressure control valves fall below the respective associated minimum actuation time, in an advantageous embodiment it is first determined which actuation time deviates the least from the respective associated minimum actuation time. For the pressure control valve associated with the actuation time that deviates the least, a correction actuation time is calculated and the actuation times of all other pressure control valves are not recalculated and they are also not actuated, so that only one pressure control valve or one wheel brake contributes to braking, i.e. implements the target vehicle deceleration and accordingly compensates for the braking effect of all other non-actuated pressure control valves. The correction actuation time accordingly increases markedly. Advantageously, if the correction actuation time for the corresponding pressure control valve is also less than the minimum actuation time of this pressure control valve, the correction actuation time is increased to the minimum actuation time in order to achieve the braking aim at the desired level with high reliability.

In an alternative embodiment, in the case in which actuation times less than the respective associated minimum actuation time have been calculated during the first calculation of actuation times for all pressure control valves, the pressure control valve is first determined for which an actuation time has been calculated that deviates the most from the minimum actuation time of the pressure control valve associated therewith. Then, a recalculation of correction actuation times is carried out for all remaining pressure control valves, i.e. for all apart from this pressure control valve with the determined greatest deviation of the actuation time. In the case in which a correction actuation time less than the minimum actuation time associated with the respective pressure control valve is again calculated for all recalculated pressure control valves during the recalculation of the correction actuation times for the remaining pressure control valves, a further recalculation is carried out without taking into account the pressure control valve that differs the most. This recalculation is carried out until the time at which an actuation time less than the minimum actuation time associated with this pressure control valve is calculated for the last of the pressure control valves available for regulation. In this case, the correction actuation time for this last pressure control valve is increased to the minimum actuation time associated with the pressure control valve and only this pressure control valve is used for the deceleration.

If not all actuation times fall below the respective associated minimum actuation time during the first calculation of actuation times in a timing cycle, i.e. in a phase of calculations of new actuation times, then the pressure control valves whose actuation times fall below the respective minimum actuation time are not taken into account during the recalculation and also during the actuation. For the other pressure control valves for which the minimum actuation time is exceeded in that case—or are the same as the minimum actuation time—a correction actuation time is calculated that compensates the braking effect of the omitted pressure control valves and that then lies above the minimum actuation time for the respective pressure control valve in any case; the braking aim can also be achieved safely and reliably, without braking above the target vehicle deceleration occurring during this that has to be suitably readjusted.

As a result, it is advantageously achieved that during braking during which, owing to the calculations of the actuation times of the pressure control valves, it should be achieved that both the vehicle-actual-deceleration is adjusted to a specified target vehicle deceleration and at the same time a desired actual wheel rotational behavior is set between wheels of axles of the vehicle, according to embodiments of the invention a wheel brake on a vehicle axle is actuated that is the most suitable to prevent overbraking or underbraking, because the calculation of the actuation times or the correction actuation times as a function of the actual wheel rotational behavior is carried out and the wheel brake with the actuation time is the most suitable. The selection of the wheel brakes or the pressure control valves for which a correction actuation time is determined changes continuously during the braking process, because the actual wheel rotational behavior changes because of the braking, i.e. the actuation times also change continuously. Thus, in any braking situation the most suitable pressure control valve is selected, especially in the case of a ramp-shaped profile of a braking demand, to achieve optimized control sensitivity of the braking, whereby overall the braking behavior is steadied and optimized for the reasons already mentioned.

When actuating the pressure control valves to bring about the target vehicle deceleration, for example in the case of a ramp-shaped profile of the target vehicle deceleration against time and/or a desired or specified target wheel rotational behavior of the wheels of a pair of axles, there is a wait of a fixed waiting time between two timing cycles before new actuation times are calculated to wait for a reaction of the vehicle in relation to its vehicle-actual-deceleration and/or an actual wheel rotational behavior when braking is completed, i.e. in particular, dead times are allowed to elapse until a pressure change in the wheel brakes has also been set in each case in a determined wheel rotational behavior. Following this waiting time, actuation times adjusted for the current driving and braking behavior of the vehicle can be reliably calculated again from the correspondingly changed vehicle-actual-deceleration and/or the changed actual wheel rotational behavior and may be corrected. The fixed waiting time corresponds to a minimum waiting time of for example 250 ms for this.

According to an alternative embodiment, to additionally improve the accuracy of implementation of the target vehicle deceleration by the vehicle-actual-deceleration as a result of the next pressure control and the related fineness of control, it is provided to set a variable waiting time between two timing cycles that is greater than or equal to the minimum waiting time. In this case, the waiting time is selected such that the correction actuation time for each pressure control valve to be actuated is in each case greater than or equal to the minimum actuation time for this pressure control valve. For this purpose, following a completed timing cycle in which pressure control valves were actuated, first the minimum waiting time of for example 250 ms is waited. Following expiry of the set minimum waiting time, actuation times are calculated for the next timing cycle in the first calculation step in accordance with the principle according to embodiments of the invention, and for the case in which the correction actuation time for the last pressure control valve that is available for regulation is less than the respective associated minimum actuation time for this pressure control valve following a recalculation in the second calculation step, initially no actuation of pressure control valves is carried out.

Despite this, following a specified time interval of for example 10 ms, a recalculation is again carried out in such a way that correction actuation times are calculated either for all pressure control valves or only for the last pressure control valve that is available for regulation, for which correction actuation times have already been calculated. If the correction actuation time for the relevant pressure control valve is less than the minimum actuation time even after the time interval of 10 ms, i.e. after a total of 260 ms since the last timing cycle, it is recalculated again after a further 10 ms.

The correction actuation time is thus successively checked as to whether the respective minimum actuation time is achieved after one or more time intervals, wherein the correction actuation time increases with the result that the target vehicle deceleration also increases with time, for example in a ramp-shaped manner. Only if the respective correction actuation time is greater than or equal to the corresponding minimum actuation time, is actuation of the corresponding pressure control valve carried out with the determined correction actuation time.

It can thus be advantageously prevented that a correction actuation time of the last pressure control valve that is available for regulation is necessarily increased to the minimum actuation time and as a result a higher vehicle-actual-deceleration is set than is actually demanded. As a result, accuracy when implementing the target vehicle deceleration and control sensitivity during braking can be improved and in general the braking behavior can be steadied, because there is less need for readjustment and the actuation of at least one pressure control valve is only carried out if the demanded target vehicle deceleration is no longer exceeded by the next pressure control.

This especially comes into play if the target vehicle deceleration increases or decreases very slowly with a ramp-shaped time-dependent profile, in particular in the case of a vehicle with no load or only a small load, i.e. in a load situation with a high potential for the vehicle-actual-deceleration to be implemented by the vehicle brake system that is designed for a fully loaded vehicle. Then the difference in the target vehicle deceleration in two successive timing cycles is sometimes so small that the corresponding correction actuation time lies below the minimum actuation time. By extending the time of the successive actuations of the respective pressure control valves, the respective next actuation time is adjusted to the change in the target vehicle deceleration that is to be brought about. In the case of a very steep increase or decrease by contrast, it is to be expected that the change in the target vehicle deceleration on the ramp corresponds to a longer correction actuation time or that the correction of originally calculated actuation times is not necessary.

Advantageously, in the event of exceeding the minimum actuation time because of a correction of the actuation times of the respective pressure control valve, the actuation of this pressure control valve can be divided into multiple regulation steps or actuation cycles if the correction actuation time exceeds the minimum actuation time by a certain amount. As a result, advantageously the control sensitivity of braking can be further improved, because for example a correction actuation time can be divided into two or more actuation cycles, each greater than the minimum actuation time.

Each pressure control valve preferably comprises an inlet valve and an outlet valve, each of which is implemented as a clocked or pulse-actuated 2/2-way valve. Therefore, two-part consideration of the actuation times is carried out, i.e. an inlet valve actuation time for the inlet valve and an outlet valve actuation time for the outlet valve are calculated as a pair in each case, wherein this calculation is carried out in accordance with the aforementioned principles, i.e. a respective outlet valve minimum actuation time and an inlet valve minimum actuation time are associated with the outlet valve and the inlet valve respectively of a respective pressure control valve.

If there is a braking demand in the form of a target vehicle deceleration, thus an outlet valve actuation time and an inlet valve actuation time are calculated for the inlet valves and the outlet valves of each pressure control valve, and these are compared with the respectively associated outlet valve minimum actuation time or the inlet valve minimum actuation time. In the event of undershooting of the actuation times for the inlet valve or the outlet valve of a pressure control valve, a corresponding paired recalculation of correction inlet valve actuation times and correction outlet valve actuation times is carried out for the inlet valves or outlet valves of the respective pressure control valves, taking into account that after this a smaller number of pressure control valves is actuated. In this case for example, the selection of the pressure control valves to be actuated is carried out depending on the pressure control valve for which the outlet valve actuation time and/or the inlet valve actuation time is closer to the respective minimum actuation time for the outlet valve or the inlet valve.

According to a preferred embodiment, the calculations of the actuation times are carried out for each axle, i.e. in the corresponding calculation steps, in particular an actual wheel rotational behavior is taken into account that results for example from an average value of the rotational behavior of the wheels on a vehicle axle. It is thereby taken into account to what extent a vehicle axle as a whole is overbraked or underbraked relative to another vehicle axle, also as a whole. However, the recalculation in the second or further calculation step is carried out in particular depending on average values for the minimum actuation times of pressure control valves on all wheels of a vehicle axle. Therefore, during the calculation of the correction actuation times, the axle-wise actuation of preferably two wheel brakes that are the most suitable to achieve the control aims—interaxle target wheel rotational behavior and target vehicle deceleration—is taken into account at the same time. Thus, axle-wise consideration of the braking is always carried out.

Whether a calculation of the actuation times is carried out from a wheel-wise or axle-wise consideration depends on stability requirements, for example. Therefore, axle-wise consideration is purposeful for a braking demand from an ACC controller or an AEBS controller for example, because the deceleration of individual wheels can result in an unwanted loss of stability. In the case of a rollover prevention system (RSC) by contrast, it is purposeful to only consider the wheels on the outside of a turn, because in the event of an impending rollover of the vehicle the wheels on the inside of a turn cannot contribute to braking or can contribute less to braking. Thus, the consideration is essentially to be selected depending on whether only longitudinal accelerations of the vehicle are relevant, for example with ACC, AEBS, EBD or EBL braking, or whether lateral accelerations are also involved, for example for RSC or YC braking or braking processes.

In the case in which all actuation times calculated in the first calculation step exceed the respectively associated minimum actuation times, no recalculation is carried out because the braking aim can already be safely and reliably achieved without braking above the target vehicle deceleration that must be subsequently readjusted occurring in doing so.

The target wheel rotational behavior is preferably additionally dependent on the determined target vehicle deceleration and/or the determined vehicle-actual-deceleration. For example, the target wheel rotational behavior can, with increasing target vehicle deceleration or vehicle-actual-deceleration, decrease towards synchronous wheel rotational behavior of the wheels of the first vehicle axle and the further vehicle axle in such a way that premature locking of the first vehicle axle or the second vehicle axle is counteracted; safety and braking comfort increase.

The minimum actuation times or the inlet valve minimum actuation times and the outlet valve minimum actuation times can preferably each be constant and specified in advance or can also be variable. Therefore, for example it can be provided that the respective minimum actuation time can be adjusted depending on a temperature of the respective valve body, a type or design of the respective valve or the vehicle axle on which the pressure control valve is disposed. As a result, the regulation can advantageously be carried out more accurately and safely, because correction of the actuation times is only carried out if the actual minimum actuation time is undershot.

Because actuation is carried out of fewer than all pressure control valves that are available in the vehicle for regulation and therefore advantageously also fewer are to be readjusted, the noise level perceived by the driver also reduces.

FIG. 1 shows a vehicle 100 with an electronically controlled brake system 200 with the components that are relevant here. Therefore, a first rear axle HA1 with rear wheels 1, 2 and a front axle VA with front wheels 3, 4 are provided. A possible second rear axle HA2 is only indicated in a dashed form. The rear wheels 1, 2 can be braked by means of rear wheel brakes 5, 6 and the front wheels 3, 4 can be braked by means of front wheel brakes 7, 8. The brake system 200 can be an electrohydraulic or electropneumatic brake system, i.e. a fluid pressure or an air pressure is controlled.

For brake slip-regulated deceleration, the brake system 200 comprises an anti-lock brake system (ABS) with a control device 10 that actuates pressure control valves in a pulsed manner—here in the form of ABS control valves 11, 12, 13, 14—depending on a detected brake slip $BS_1$, $BS_2$, $BS_3$, $BS_4$ on the respective wheel 1, 2, 3, 4. The brake slip $BS_1$, $BS_2$, $BS_3$, $BS_4$ of the wheels 1, 2, 3, 4 is determined by the control device 10 by means of revolution rate sensors 1.1, 1.2, 1.3, 1.4, with whose measurement signals the current wheel revolution rate $n_1$, $n_2$, $n_3$, $n_4$ on the respective wheels 1, 2, 3, 4 is determined by the control unit 10 in order to determine the brake slip $BS_1$, $BS_2$, $BS_3$, $BS_4$ therefrom.

According to this exemplary embodiment, a first number A1 of four ABS control valves 11, 12, 13, 14 is provided. Each ABS control valve 11, 12, 13, 14 comprises an inlet valve 15.$i$; i=1, ... , 4, each embodied as a 2/2-way solenoid valve, and an outlet valve 16.$i$; i=1, ... , 4, which can be changed to an open position or a closed position depending on the actuation by a control device 10, so that a brake pressure $p_1$, $p_2$, $p_3$, $p_4$ on the respective wheel brake 5, 6, 7, 8 can be maintained, increased or reduced by the ABS control valve 11, 12, 13, 14. In the following, where no specific value is stated for the index "i", in each case this means that outlet valves 16.$i$ and inlet valves 15.$i$ with the same value of "i" belong to the same ABS control valve 11, 12, 13, 14. Furthermore, reference characters indexed with "i" each relate to the inlet valve 15.$i$ or the outlet valve 16.$i$ with the respective index "i".

If an inlet valve 15.$i$ is open and the respective outlet valve 16.$i$ (the same "i") is shut off, the corresponding wheel brakes 5, 6, 7, 8 can be subjected to a brake pressure $p_1$, $p_2$, $p_3$, $p_4$ provided by pressure reservoir containers 9.1, 9.2 for the corresponding brake circuit and controlled by a brake valve 30 and relay valves 25, 26, and thus corresponding braking by the wheels 1, 2, 3, 4 is brought about. If the inlet valve 15.$i$ is shut off and the respective outlet valve 16.$i$ is open, the rear and front wheel brakes 5, 6, 7, 8 are vented and the braking effects by the wheels 1, 2, 3, 4 is reduced. If both the inlet valve 15.$i$ and the respective outlet valve 16.$i$ are shut off, a brake pressure $p_1$, $p_2$, $p_3$, $p_4$ acting on the rear and the front wheel brakes 5, 6, 7, 8 is maintained.

The brake pressures $p_1$, $p_2$, $p_3$, $p_4$ on the respective wheel brakes 5, 6, 7, 8 of the wheels 1, 2, 3, 4 can be set for individual wheels by the control device 10, so that accordingly a response can be made to a case of exceeding a target brake slip $BS_{Soll}$ on one of the wheels 1, 2, 3, 4. This means that if for example it is detected by the control device 10 that the brake slip $BS_3$ on the left front wheel 3 is different from and exceeds a target brake slip $BS_{Soll}$ i.e. the left front wheel 3 is tending to slip or to lock, the control device 10 causes the brake pressure $p_3$ on the wheel brake 7 to be maintained or reduced by suitable actuation of the ABS control valves 13.

The ABS control valves 11, 12, 13, 14 are controlled by the control device 10 by actuating the respective ABS control valve 11, 12, 13, 14 or the inlet valve 15.$i$ and/or the outlet valve 16.$i$ of the respective ABS control valve 11, 12, 13, 14 in a pulsed manner over an actuation time $\Delta t_{EV}.i$, $\Delta t_{AV}.i$; i=1, ... , 4, so that a certain pressure difference $\Delta p_1$, $\Delta p_2$, $\Delta p_3$, $\Delta p_4$ is set on the respective ABS control valve 11, 12, 13, 14 that brings about a corresponding braking effect on this wheel 1, 2, 3, 4 to regulate to the target brake slip $BS_{Soll}$.

Besides the anti-lock brake system, a braking demand can also be specified by an arbitrary driver assistance system or stability control system, for example a stability program (ESP), an automatic cruise control system (ACC), a rollover prevention system (RSC), an emergency braking system (AEBS), an antislip regulation system (ASR) or a yaw rate controller (YC), or depending on driver braking, for example by a brake force limiter (EBL) or a brake force distributor (EBD). For this purpose, either a target vehicle deceleration $z_{Soll}$ is determined in an external control unit 101 of the corresponding driver assistance system and this is output directly to the control unit 10, which thereupon determines a corresponding pressure difference $\Delta p_1$, $\Delta p_2$, $\Delta p_3$, $\Delta p_4$ for actuation of the respective ABS control valves 11, 12, 13, 14, or the external control unit 101 directly determines a pressure difference $\Delta p_1$, $\Delta p_2$, $\Delta p_3$, $\Delta p_4$ corresponding to the target vehicle deceleration $z_{Soll}$ and outputs this to the control unit 10 for actuation of the respective ABS control valves 11, 12, 13, 14.

Figure 2:
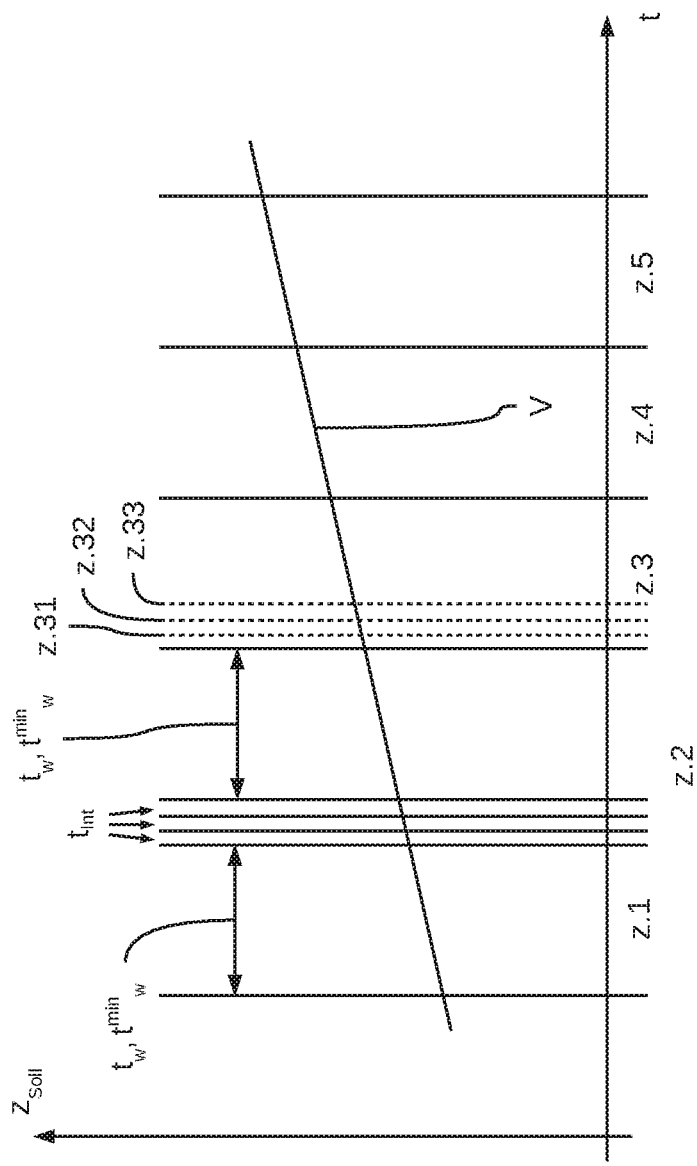
FIG. 2 shows an example of a profile of a target vehicle deceleration.

In this case, the target vehicle deceleration $z_{Soll}$ can for example vary against time t in a ramp-shaped fashion, as shown for example in the profile V in FIG. 2, wherein to bring about this ramp-shaped target vehicle deceleration $z_{Soll}$ the profile V is divided into timing cycles z.i and actuation of the corresponding ABS control valves 11, 12, 13, 14 is carried out at the start of each timing cycle z.i to demand the target vehicle deceleration $z_{Soll}$ lying on the ramp at this time t.

The calculation of the pressure difference $\Delta p_1$, $\Delta p_2$, $\Delta p_3$, $\Delta p_4$ is carried out in particular depending on the extent to which an actually present vehicle-actual-deceleration $z_{Ist}$ differs from the specified target vehicle deceleration $z_{Soll}$ and depending on an actual wheel rotational behavior $ds_{Ist}$ characterized by a difference in a differential slip ds or an angular speed ω between wheels 1, 2, 3, 4 of different vehicle axles VA, HA1, HA2, wherein this results from the respective brake slip $BS_1$, $BS_2$, $BS_3$, $BS_4$ or the revolution rates $n_1$, $n_2$, $n_3$, $n_4$ determined by means of the revolution rate sensors 1.1, 1.2, 1.3, 1.4. Therefore, the actual wheel rotational behavior $ds_{Ist}$ indicates the extent to which for example the front axle VA (first vehicle axle) or individual wheels 3, 4 of the front axle VA is or are overbraked or underbraked in relation to the first rear axle HA1 (further vehicle axle) or individual wheels 1, 2 of the first rear axle HA1. In addition or alternatively, the difference in the rotational behavior between the wheels 3, 4 of the front axle VA and the wheels of the second rear axle HA2 can also be considered.

If for example the brake slip $BS_1$, $BS_2$ on the first rear axle HA1 is greater than the brake slip $BS_3$, $BS_4$ on the front axle VA, wherein in this example in each case average values of the brake slips $BS_1$, $BS_2$ or $BS_3$, $BS_4$ of a vehicle axle VA, HA1, HA2 are considered, then the first rear axle HA1 is overbraked relative to the front axle VA. Accordingly, to adjust the tendency to locking of the first rear axle HA1 to the front axle VA, i.e. to adjust the actual wheel rotational behavior $ds_{Ist}$ to a target wheel rotational behavior $ds_{Soll}$ while simultaneously maintaining the demanded target vehicle deceleration $z_{Soll}$, the brake pressure $p_1$, $p_2$ on the rear wheel brakes 5, 6 is to be reduced, i.e. negative $\Delta p_1$, $\Delta p_2$ are to be selected, and the brake pressure $p_3$, $p_4$ on the front wheel brakes 7, 8 is to be increased, i.e. positive $\Delta p_3$, $\Delta p_4$ are to be selected. This is carried out by a corresponding calculation of the pressure differences $\Delta p_1$, $\Delta p_2$, $\Delta p_3$, $\Delta p_4$, which can be different for each of the wheel brakes 5, 6, 7, 8 or at least axle-wise for the considered vehicle axles VA, HA1, HA2, and corresponding actuation of a specified number of wheel brakes 5, 6, 7, 8 with these pressure differences $\Delta p_1$, $\Delta p_2$, $\Delta p_3$, $\Delta p_4$ to achieve the control aims, i.e. $z_{Soll}$ and $ds_{Soll}$.

Thus, the deviation of the vehicle-actual-deceleration $z_{Ist}$ from the target vehicle deceleration $z_{Soll}$ is first determined that is to be compensated by the controlled pressure differences $\Delta p_1$, $\Delta p_2$, $\Delta p_3$, $\Delta p_4$ on the wheel brakes 5, 6, 7, 8 by the calculated actuation times $\Delta t_{EV}.i$, $\Delta t_{AV}.i$, wherein this deviation is then correspondingly distributed depending on the actual wheel rotational behavior $ds_{Ist}$ on the vehicle axles VA, HA1, HA2 by correspondingly adjusting the pressure differences $\Delta p_1$, $\Delta p_2$, $\Delta p_3$, $\Delta p_4$. The control time to reach the target vehicle deceleration $z_{Soll}$ thus takes priority over the control aim of reaching the target wheel rotational behavior $ds_{Soll}$.

In order to determine from the demanded pressure difference $\Delta p_1$, $\Delta p_2$, $\Delta p_3$, $\Delta p_4$ an actuation time $\Delta t_{EV}.i$ (inlet valve actuation time), $\Delta t_{AV}.i$ (outlet valve actuation time) within which the inlet valve 15.$i$ or the outlet valve 16.$i$ of the respective ABS control valve 11, 12, 13, 14 is to be actuated in a pulsed manner to bring about the pressure difference $\Delta p_1$, $\Delta p_2$, $\Delta p_3$, $\Delta p_4$, for a demanded pressure difference $\Delta p_1$, $\Delta p_2$, $\Delta p_3$, $\Delta p_4$ in the direction of increasing the brake pressure $\Delta p_1$, $\Delta p_2$, $\Delta p_3$, $\Delta p_4$ a first pressure difference characteristic $K_1$ stored in the control unit 10 for the respective inlet valve 15.$i$ is accessed and for a demanded pressure difference $\Delta p_1$, $\Delta p_2$, $\Delta p_3$, $\Delta p_4$ in the direction of reducing the brake pressure $\Delta p_1$, $\Delta p_2$, $\Delta p_3$, $\Delta p_4$ a second pressure difference characteristic $K_2$ for the respective outlet valve 16.$i$ is accessed. Each of these describes a previously empirically determined dependency of the respective actuation time $\Delta t_{EV}.i$, $\Delta t_{AV}.i$ on the demanded pressure difference $\Delta p_1$, $\Delta p_2$, $\Delta p_3$, $\Delta p_4$ for the respective ABS control valve 11, 12, 13, 14. Using these, actuation times $\Delta t_{EV}.i$, $\Delta t_{AV}.i$ for the inlet valves 15.$i$ and/or outlet valves 16.$i$ are first calculated in a first calculation step for each ABS control valve 11, 12, 13, 14, i.e. for the first number A1.

If the vehicle-actual-deceleration $z_{Ist}$ differs in the negative sense from the target vehicle deceleration $z_{Soll}$ that is to be brought about, pressure increases are only carried out and actuated with inlet valves 15.$i$ for which corresponding inlet valve actuation times $\Delta t_{EV}.i$ are calculated. If by contrast the vehicle-actual-deceleration $z_{Ist}$ differs from the target vehicle deceleration $z_{Soll}$ that is to be brought about in the positive sense, pressure reductions are only carried out with outlet valves 16.$i$ for which corresponding outlet valve actuation times $\Delta t_{AV}.i$ are calculated.

If the vehicle-actual-deceleration $z_{Ist}$ in a timing cycle equals the target vehicle deceleration $z_{Soll}$ that is to be brought about or if the vehicle-actual-deceleration $z_{Ist}$ lies within a tolerance about the target vehicle deceleration $z_{Soll}$, and if at the same time there is an actual wheel rotational behavior $ds_{Ist}$ that is not equal to the target wheel rotational behavior $ds_{Soll}$, or if the actual wheel rotational behavior $ds_{Ist}$ lies outside a tolerance about the target wheel rotational behavior $ds_{Soll}$, in a preferred embodiment both pressure reductions are carried out in the next timing cycle on wheels 1, 2, 3, 4 for which a greater slip has been determined, for which actuation times $\Delta t_{AV}.i$ for the outlet valves are calculated, and pressure increases are carried out on wheels for which a lesser slip has been determined, for which actuation times $\Delta t_{EV}.i$ for the inlet valves are calculated, i.e. in the present timing cycle both actuation times $\Delta t_{EV}.i$, $\Delta t_{AV}.i$ for inlet valves 15.$i$ and for outlet valves 16.$i$ of an ABS control valve 11, 12, 13, 14 are calculated and are actuated in a suitable manner, i.e. actuation times $\Delta t_{EV}.i$ for inlet valves 15.$i$ on a vehicle axle VA, HA1, HA2 and actuation times $\Delta t_{AV}.i$ for outlet valves 16.$i$ on another vehicle axle VA, HA1, HA2 can be calculated and actuated at the same time.

In order to achieve reliable and safe regulation of the brake system 200, actuation times $\Delta t_{EV}.i$, $\Delta t_{AV}.i$ calculated for an inlet valve 15.$i$ and an outlet valve 16.$i$ of the respective ABS control valve 11, 12, 13, 14 are compared with minimum actuation times $\Delta t^{min}_{EV}.i$, $\Delta t^{min}_{AV}.i$, wherein for example a temperature-dependent (T) minimum actuation time $\Delta t^{min}_{EV}.i$, $\Delta t^{min}_{AV}.i$ is associated with each inlet valve 15.$i$ and each outlet valve 16.$i$, i.e. an inlet valve minimum actuation time $\Delta t^{min}_{EV}.i$ for the inlet valve 15.$i$ and an outlet valve minimum actuation time $\Delta t^{min}_{AV}.i$ for the outlet valve 16.$i$.

If all the calculated actuation times $\Delta t_{EV}.i$, $\Delta t_{AV}.i$ exceed the respective associated minimum actuation times $\Delta t^{min}_{EV}.i$, $\Delta t^{min}_{AV}.i$, then the respective actuation times $\Delta t_{EV}.i$, $\Delta t_{AV}.i$ are used unchanged for actuation of the respective pressure control valves 11, 12, 13, 14.

But if only one of the calculated actuation times $\Delta T_{EV}.i$, $\Delta t_{AV}.i$ is less than the respectively associated minimum actuation time $\Delta t^{min}_{EV}.i$, $\Delta t^{min}_{AV}.i$, recalculation of the actuation times $\Delta T_{EV}.i$, $\Delta t_{AV}.i$ is carried out, wherein for this purpose correction actuation times $\Delta t^{korr}_{EV}.i$ (correction inlet valve actuation time), $\Delta t^{korr}_{AV}.i$ (correction outlet valve actuation time) are determined, which thus also correct the pressure difference $\Delta p_1$, $\Delta p_2$, $\Delta p_3$, $\Delta p_4$ controlled by an ABS control valve 11, 12, 13, 14. This means that in the case in which for example the minimum actuation time $\Delta t^{min}_{EV}.1$ is undershot only for the inlet valve 15.1 of the ABS control valve 11 on the left rear wheel 1, a recalculation of the actuation times $\Delta T_{EV}.i$, $\Delta t_{AV}.i$ is carried out for the ABS control valves 12, 13, 14 of the other wheels 2, 3, 4, wherein depending on whether a pressure increase, a pressure reduction or maintaining pressure is demanded, the recalculation is only carried out for the inlet valve 15.$i$, the outlet valve 16.$i$ or for a pair of the inlet valve 15.$i$ and the outlet valve 16.$i$ of the respective ABS control valve 12, 13, 14, wherein according to the following principle correction actuation times $\Delta t^{korr}_{EV}.i$, $\Delta t^{korr}_{AV}.i$ are not calculated for each ABS control valve 11.

If all the calculated actuation times $\Delta T_{EV}.i$, $\Delta t_{AV}.i$ are less than the respectively associated minimum actuation time $\Delta t^{min}_{EV}.i$, $\Delta t^{min}_{AV}.i$, then in an advantageous embodiment the actuation time $\Delta T_{EV}.i$, $\Delta t_{AV}.i$ that is closest to the minimum actuation time $\Delta t^{min}_{EV}.i$, $\Delta t^{min}_{AV}.i$ that is associated with it is first determined. Correction actuation times $\Delta t^{korr}_{EV}.i$, $\Delta t^{korr}_{AV}.i$ are then determined for this ABS control valve 11, 12, 13, 14 or the inlet valve 15.i and the outlet valve 16.i of this ABS control valve 11, 12, 13, 14. The other ABS control valves 11, 12, 13, 14 are not taken into account in the recalculation and are also not actuated.

The correction actuation times $\Delta t^{korr}_{EV}.i$, $\Delta t^{korr}_{AV}.i$ result in both cases from the fact that the target vehicle deceleration $z_{Soll}$ is now only brought about by these two ABS control valves, i.e. by a second number A2 of ABS control valves 11, 12, 13, 14 that is smaller than the first number A1, so that different pressure differences $\Delta p_1$, $\Delta p_2$, $\Delta p_3$, $\Delta p_4$ also result for these two ABS control valves 11, 12, 13, 14.

If the correction actuation times $\Delta t^{korr}_{EV}.i$, $\Delta t^{korr}_{AV}.i$ are also less than the respectively associated minimum actuation times $\Delta t^{min}_{EV}.i$, $\Delta t^{min}_{AV}.i$, the correction actuation times $\Delta t^{korr}_{EV}.i$, $\Delta t^{korr}_{AV}.i$ are accordingly increased to the minimum actuation times $\Delta t^{min}_{EV}.i$, $\Delta t^{min}_{AV}.i$. Then control is only carried out of the pressure differences $\Delta p_1$, $\Delta p_2$, $\Delta p_3$, $\Delta p_4$ on the respective wheels 1, 2, 3, 4 corresponding to the correction actuation times $\Delta t^{korr}_{EV}.i$, $\Delta t^{korr}_{AV}.i$.

According to an alternative embodiment, in the case in which all actuation times $\Delta T_{EV}.i$, $\Delta t_{AV}.i$ are less than the respectively associated minimum actuation time $\Delta t^{min}_{EV}.i$, $\Delta t^{min}_{AV}.i$, it is first determined for which ABS control valve 11, 12, 13, 14 an actuation time $\Delta T_{EV}.i$, $\Delta t_{AV}.i$ has been calculated that differs the most from the minimum actuation time $\Delta t^{min}_{EV}.i$, $\Delta t^{min}_{AV}.i$ that is associated with this ABS control valve 11, 12, 13, 14. Then a recalculation of correction actuation times $\Delta t^{korr}_{EV}.i$, $\Delta t^{korr}_{AV}.i$ is carried out for all remaining ABS control valves, i.e. for all ABS control valves apart from this ABS control valve 11, 12, 13, 14 with the determined greatest deviation. If in this recalculation of correction actuation times $\Delta t^{korr}_{EV}.i$, $\Delta t^{korr}_{AV}.i$ for the remaining ABS control valves 11, 12, 13, 14 a correction actuation time $\Delta t^{korr}_{EV}.i$, $\Delta t^{korr}_{AV}.i$ has been determined again for an ABS control valve 11, 12, 13, 14 that is less than the minimum actuation time $\Delta t^{min}_{EV}.i$, $\Delta t^{min}_{AV}.i$ associated with this ABS control valve 11, 12, 13, 14, a further recalculation is carried out without taking into account this ABS control valve 11, 12, 13, 14 that differs the most. This type of recalculation is carried out until the time at which an actuation time $\Delta T_{EV}.i$, $\Delta t_{AV}.i$ that is less than the minimum actuation time $\Delta t^{min}_{EV}.i$, $\Delta t^{min}_{AV}.i$ associated with this pressure control valve 11, 12, 13, 14 is still calculated for the last of the ABS control valves 11, 12, 13, 14 that is available for regulation. In this case, the correction actuation time $\Delta t^{korr}_{EV}.i$, $\Delta t^{korr}_{AV}.i$ for this last pressure control valve 11, 12, 13, 14 is increased to the minimum actuation time $\Delta t^{min}_{EV}.i$, $\Delta t^{min}_{AV}.i$ associated with the pressure control valve 11, 12, 13, 14 and only this pressure control valve 11, 12, 13, 14 is used for the deceleration.

The calculations of the respective actuation times $\Delta T_{EV}.i$, $\Delta t_{AV}.i$ and the correction actuation times $\Delta t^{korr}_{EV}.i$, $\Delta t^{korr}_{AV}.i$, i.e. carrying out the method, is carried out in this case on the control device 10, wherein the calculations can also be outsourced. Suitable software for the calculation can be provided on the control device 10.

For controlling the pressure differences $\Delta p_1$, $\Delta p_2$, $\Delta p_3$, $\Delta p_4$, first a 3/2-way valve 21 for the wheel brakes 7, 8 of the front axle VA or a 3/2-way valve 22 for the wheel brakes 5, 6 of the rear axle HA, which are connected to a further pressure reservoir container 9.3, is actuated by the control device 10. The 3/2-way valves 21, 22 are each connected via a non-return valve 23, 24 to a relay valve 25, 26 for the respective vehicle axle VA, HA. In the case of suitable actuation of the 3/2-way valves 21, 22, as a result a pressure that may be provided via the brake valve 30 is increased by enabling the connection between the pressure reservoir containers 9.1, 9.2 and the ABS control valves 11, 12, 13, 14 via the relay valves 25, 26. Thus, a brake pressure $p_1$, $p_2$, $p_3$, $p_4$ on the front and/or rear wheel brakes 5, 6, 7, 8 can also be increased via the ABS control valves 11, 12, 13, 14 to satisfy a demanded pressure difference $\Delta p_1$, $\Delta p_2$, $\Delta p_3$, $\Delta p_4$ in the sense of increasing the brake pressure $p_1$, $p_2$, $p_3$, $p_4$. Likewise, a brake pressure $p_1$, $p_2$, $p_3$, $p_4$ can be reduced via the ABS control valves 11, 12, 13, 14 on the front or rear wheel brakes 5, 6, 7, 8, even to below a pressure that may be provided via the brake valve 30, to satisfy a demanded pressure difference $\Delta p_1$, $\Delta p_2$, $\Delta p_3$, $\Delta p_4$ in the sense of reducing the brake pressure $p_1$, $p_2$, $p_3$, $p_4$ and thereby to achieve the control aim, i.e. $z_{Soll}$ and $ds_{Soll}$.

If not all the calculated actuation times $\Delta T_{EV}.i$, $\Delta t_{AV}.i$ are less than the respectively associated minimum actuation time $\Delta t^{min}_{EV}.i$, $\Delta t^{min}_{AV}.i$, corrected actuation times $\Delta t^{korr}_{EV}.i$, $\Delta t^{korr}_{AV}.i$ are calculated for all those ABS control valves 11, 12, 13, 14 that exceed or correspond to the minimum actuation time $\Delta t^{min}_{EV}.i$, $\Delta t^{min}_{AV}.i$, so that the target vehicle deceleration $z_{Soll}$ is mainly brought about by the ABS control valves 11, 12, 13, 14 for which a permissible actuation time $\Delta T_{EV}.i$, $\Delta t_{AV}.i$ has already been calculated. Thus, only one recalculation is carried out for these ABS control valves 11, 12, 13, 14 to compensate the vehicle-actual-deceleration resulting from the omitted ABS control valves 11, 12, 13, 14.

According to an alternative embodiment, with which axle-wise actuation is always carried out, the following case discrimination is carried out:

If all the calculated actuation times $\Delta T_{EV}.i$, $\Delta t_{AV}.i$ are less than the respective minimum actuation time $\Delta t^{min}_{EV}.i$, $\Delta t^{min}_{AV}.i$, first a summation actuation time $\Delta t^{VA}_{Sum}$, $\Delta t^{HA1}_{Sum}$, $\Delta t^{HA2}_{Sum}$ is formed from the actuation times $\Delta T_{EV}.i$, $\Delta t_{AV}.i$ of the ABS control valves 11, 12, 13, 14 of a vehicle axle VA, HA1, HA2. In the case of axle-wise actuation, correction actuation times $\Delta t^{korr}_{EV}.i$, $\Delta t^{korr}_{AV}.i$ are then calculated for those ABS control valves 11, 12, 13, 14 that are on the vehicle axle VA, HA1, HA2 with the greatest summation actuation time $\Delta t^{VA}_{Sum}$, $\Delta t^{HA1}_{Sum}$, $\Delta t^{HA2}_{Sum}$.

If not all the calculated actuation times $\Delta T_{EV}.i$, $\Delta t_{AV}.i$ are less than the respective minimum actuation time $\Delta t^{min}_{EV}.i$, $\Delta t^{min}_{AV}.i$, further differentiation is carried out:

If there is one (or more) vehicle axle(s) VA, HA1, HA2 for which actuation times $\Delta T_{EV}.i$, $\Delta t_{AV}.i$ that lie above the respective minimum actuation time have been calculated on all wheels 1, 2, 3, 4, then correction actuation times $\Delta t^{korr}_{EV}.i$, $\Delta t^{korr}_{AV}.i$ are only calculated for these ABS control valves 11, 12, 13, 14 of these vehicle axle(s) VA, HA1, HA2.

If the calculated actuation time $\Delta T_{EV}.i$, $\Delta t_{AV}.i$ exceeds the minimum actuation time $\Delta t^{min}_{EV}.i$, $\Delta t^{min}_{AV}.i$ on only one wheel 1, 2, 3, 4 on each vehicle axle VA, HA1, HA2, first a summation actuation time $\Delta t^{VA}_{Sum}$, $\Delta t^{HA1}_{Sum}$, $\Delta t^{HA2}_{Sum}$ is formed from the actuation times $\Delta T_{EV}.i$, $\Delta t_{AV}.i$ of the ABS control valves 11, 12, 13, 14 of each vehicle axle VA, HA1, HA2. In the case of axle-wise actuation, correction actuation times $\Delta t^{korr}_{EV}.i$, $\Delta t^{korr}_{AV}.i$ are then calculated for those ABS control valves 11, 12, 13, 14 on the vehicle axle VA, HA1, HA2 with the greatest summation actuation time $\Delta t^{VA}_{Sum}$, $\Delta t^{HA1}_{Sum}$, $\Delta t^{HA2}_{Sum}$.

For actuation of the ABS control valves 11, 12, 13, 14 with the corresponding actuation times $\Delta T_{EV}.i$, $\Delta t_{AV}.i$ or correction actuation times $\Delta t^{korr}_{EV}.i$, $\Delta t^{korr}_{AV}.i$ over several timing cycles z.i, for example with the ramp-shaped profile V of the target vehicle deceleration $z_{Soll}$ that is shown in FIG. 2, it is provided to wait for a waiting time $t_W$ between each timing cycle z.i before the actuation times $\Delta T_{EV}.i$, $\Delta t_{AV}.i$ or the correction actuation times $\Delta t^{korr}_{EV}.i$, $\Delta t^{korr}_{AV}.i$ for the next timing cycle z.i are determined from the target vehicle deceleration $z_{Soll}$ lying on the ramp and the ABS control valves 11, 12, 13, 14 are actuated accordingly. The waiting time $t_W$ is approx. 250 ms here, within which it is waited until the vehicle 100 has actually reacted to the braking of the previous timing cycle z.i.

According to one embodiment, a variable waiting time $\Delta t_W$ is provided, wherein first a minimum waiting time $t^{min}_w$ is waited, which is for example 250 ms. If after this minimum waiting time $t^{min}_w$ it is determined that the correction actuation time $\Delta t^{korr}_{EV}.i$, $\Delta t^{korr}_{AV}.i$ for the last ABS control valve 11, 12, 13, 14 that is available for regulation—wheel-wise or axle-wise—is less than the minimum actuation time $\Delta t^{min}_{EV}.i$, $\Delta t^{min}_{AV}.i$ for this ABS control valve 11, 12, 13, 14, initially no actuation of the ABS control valves 11, 12, 13, 14 is carried out, i.e. the $\Delta t^{korr}_{EV}.i$, $\Delta t^{korr}_{AV}.i$ of these ABS control valves 11, 12, 13, 14 is also not increased to the minimum actuation time $\Delta t^{min}_{EV}.i$, $\Delta t^{min}_{AV}.i$. Rather, after a time interval $t_{Int}$ of for example 10 ms for this ABS control valve 11, 12, 13, 14 a new correction actuation time $\Delta t^{korr}_{EV}.i$, $\Delta t^{korr}_{AV}.i$ is determined as a function of the target vehicle deceleration $z_{Soll}$ that is changed in a ramp-shaped manner against time, i.e. after $t_{Int}$=10 ms, there is a greater target vehicle deceleration $z_{Soll}$ that also corresponds to a longer correction actuation time $\Delta t^{korr}_{EV}.i$, $\Delta t^{korr}_{AV}.i$. If this correction actuation time $\Delta t^{korr}_{EV}.i$, $\Delta t^{korr}_{AV}.i$ is also shorter than the respective minimum actuation time $\Delta t^{min}_{EV}.i$, $\Delta t^{min}_{AV}.i$, after the time interval $t_{Int}$, i.e. after a further 10 ms, it is recalculated again. This recalculation is carried out until the correction actuation time $\Delta t^{korr}_{EV}.i$, $\Delta t^{korr}_{AV}.i$ is greater than or equal to the respective minimum actuation time $\Delta t^{min}_{EV}.i$, $\Delta t^{min}_{AV}.i$.

This is illustrated by way of example in FIG. 2 for the second timing cycle z.2, according to which after the minimum waiting time $t^{min}_w$ there is a wait of three time intervals $t_{Int}$ before the corrected actuation time $\Delta t^{korr}_{EV}.i$, $\Delta t^{korr}_{AV}.i$ is determined and controlled for the second timing cycle z.2, i.e. $z_{Soll}$ is only determined after a variable waiting time $\Delta t_w = t^{min}_w + 3 \times t_{Int}$, after which $\Delta t^{korr}_{EV}.i$, $\Delta t^{korr}_{AV}.i > \Delta t^{min}_{EV}.i$, $\Delta t^{min}_{AV}.i$ is determined. There is then again a wait of the minimum waiting time $t^{min}_w$ for calculating the third timing cycle z.3.

If for example in the third timing cycle z.3 a corrected actuation time $\Delta t^{korr}_{EV}.i$, $\Delta t^{korr}_{AV}.i$; i=1, 2 has been calculated for the wheels 1, 2 of the first rear axle HA1 at the start of the third timing cycle z.3, which for example is 25 ms in each case, the control sensitivity can additionally be improved by dividing the actuation of this corrected actuation time $\Delta t^{korr}_{EV}.i$, $\Delta t^{korr}_{AV}.i$ into three successive timing intervals z.31, z.32, z.33 (see FIG. 2), each of which is 11 ms long, wherein a dead time of the ABS control valves 11, 12, 13, 14 of 4 ms and a minimum actuation time $\Delta t^{min}_{EV}.i$, $\Delta t^{min}_{AV}.i$ of for example 6 ms form the basis for this, so that a deceleration is carried out in multiple small stages within a large stage, which is perceived as more pleasant by the driver.

Figure 3:
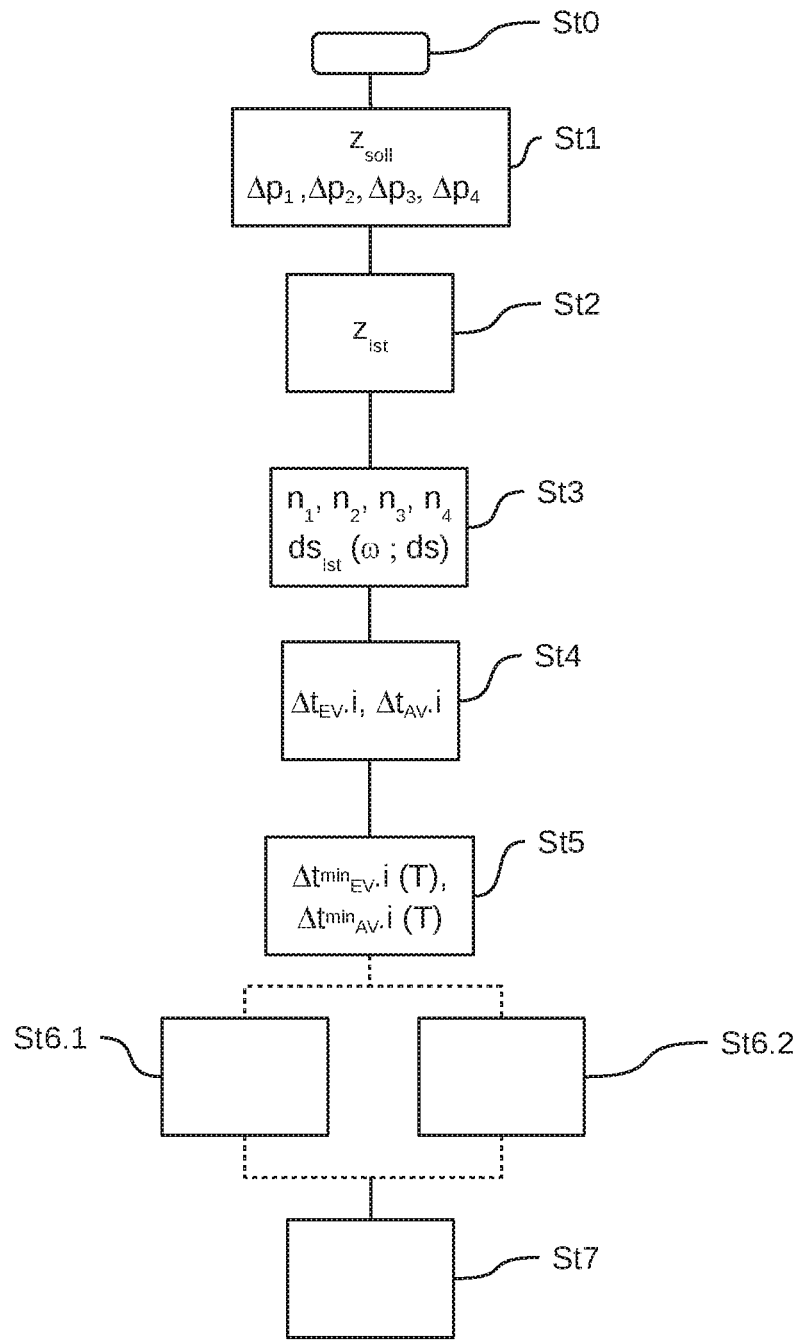
FIG. 3 shows a flow chart for carrying out a method according to an embodiment of the invention

A method according to an embodiment of the invention can thus proceed, for example, according to FIG. 3 as follows. In an initial step St0, the method is started, for example with the initiation of braking. In a first step St1, the target vehicle deceleration $z_{Soll}$ is recorded, wherein this is specified by the driver and/or the driver assistance system, for example even in the form of pressure differences $\Delta p_1$, $\Delta p_2$, $\Delta p_3$, $\Delta p_4$ that are to be controlled. In this case, the target vehicle deceleration $z_{Soll}$ can also follow a ramp-shaped profile V for different timing cycles z.i. In a second step St2, a vehicle-actual-deceleration $z_{Ist}$ is determined, for example by means of an acceleration sensor 36 and/or based on measurement signals of the wheel revolution rate sensors 1.1, 1.2, 1.3, 1.4. In a third step St3, an actual wheel rotational behavior $ds_{Ist}$ is determined that indicates the difference in the brake slip ds or in the angular speed ω between wheels 1, 2, 3, 4 of different vehicle axles VA, HA1, HA2, i.e. the extent to which a first vehicle axle VA is overbraked or underbraked relative to a further vehicle axle HA1, HA2, wherein this is determined using the wheel revolution rates $n_1$, $n_2$, $n_3$, $n_4$ determined by the wheel revolution rate sensors 1.1, 1.2, 1.3, 1.4. In this case, several actual wheel rotational behaviors $ds_{Ist}$ can also be considered, for example between the front axle VA and the first rear axle HA1 and independently of this between the front axle VA and the second rear axle HA2.

In a fourth step St4, actuation times $\Delta T_{EV}.i$, $\Delta t_{AV}.i$ are calculated for the pressure differences $\Delta p_1$, $\Delta p_2$, $\Delta p_3$, $\Delta p_4$ to be controlled, which are associated with the inlet valves 15.i or outlet valves 16.i of the respective ABS control valves 11, 12, 13, 14. In a fifth step St5, these actuation times $\Delta T_{EV}.i$, $\Delta t_{AV}.i$ are compared with the minimum actuation times $\Delta t^{min}_{EV}.i$, $\Delta t^{min}_{AV}.i$ associated with the respective ABS control valve 11, 12, 13, 14. If it is determined that all or individual actuation times $\Delta T_{EV}.i$, $\Delta t_{AV}.i$ are less than the respective minimum actuation times $\Delta t^{min}_{EV}.i$, $\Delta t^{min}_{AV}.i$, corrected actuation times $\Delta t^{korr}_{EV}.i$, $\Delta t^{korr}_{AV}.i$ are determined, wherein these are determined for a second number A2 of ABS control valves 11, 12, 13, 14 that is less than the first number A1 of pressure control valves 11, 12, 13, 14.

If the correction actuation times $\Delta t^{korr}_{EV}.i$, $\Delta t^{korr}_{AV}.i$ continue to be less than the respective minimum actuation times $\Delta t^{min}_{EV}.i$, $\Delta t^{min}_{AV}.i$, according to one embodiment the correction actuation times $\Delta t^{korr}_{EV}.i$, $\Delta t^{korr}_{AV}.i$ are increased to the minimum actuation times $\Delta t^{min}_{EV}.i$, $\Delta t^{min}_{AV}.i$ in the step St6.1. In an alternative step St6.2, instead of this there is a wait of one or more time intervals $t_{Int}$ until the target vehicle deceleration $z_{Soll}$ increases on the ramp-shaped profile V until the correction actuation times $\Delta t^{korr}_{EV}.i$, $\Delta t^{korr}_{AV}.i$ exceed the minimum actuation times $\Delta t^{min}_{EV}.i$, $\Delta t^{min}_{AV}.i$.

In a final seventh step St7, the respective ABS control valves 11, 12, 13, 14 for which a corrected actuation time $\Delta t^{korr}_{EV}.i$, $\Delta t^{korr}_{AV}.i$ has been calculated are actuated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1, 2 rear wheels
3, 4 front wheels
1.1, 1.2, 1.3, 1.4 wheel revolution rate sensors
5, 6 rear wheel brakes
7, 8 front wheel brakes
9.1, 9.2, 9.3 pressure reservoir container
10 control device
11, 12, 13, 14 ABS control valves/pressure control valves
15.i inlet valves
16.i outlet valves
21, 22 3/2-way valve
23, 24 non-return valve
25, 26 relay valve
30 brake valve
36 acceleration sensor
100 vehicle
101 control unit (external)
200 brake system
A1 first number
A2 second number
$BS_1$, $BS_2$, $BS_3$, $BS_4$ wheel-wise brake slip
ds differential slip
$ds_{Ist}$ actual wheel rotational behavior
$ds_{Soll}$ target wheel rotational behavior
$\Delta p_1$, $\Delta p_2$, $\Delta p_3$, $\Delta p_4$ differential pressure
$\Delta T_{EV}.i$, $\Delta t_{AV}.i$ inlet valve/outlet valve actuation time
$\Delta t^{korr}_{EV}.i$, $\Delta t^{korr}_{AV}.i$ correction inlet valve/outlet valve actuation time
$\Delta t^{min}_{EV}.i$, $\Delta t^{min}_{AV}.i$ inlet valve/outlet valve minimum actuation time
$\Delta t^{VA}_{sum}$, $\Delta t^{HA1}_{sum}$, $\Delta t^{HA2}_{sum}$ summation actuation time of a vehicle axle
HA1, HA2 first, second rear axle
$n_1$, $n_2$, $n_3$, $n_4$ wheel revolution rates
$p_1$, $p_2$, $p_3$, $p_4$ brake pressure
t time
$t_{Int}$ time interval
$t_w$ waiting time
$\Delta t_w$ variable waiting time
$t^{min}_w$ minimum waiting time
T temperature
V (ramp-shaped) profile
VA front axle
ω angular speed
z.i timing cycle
z.ij timing interval
$z_{Soll}$ target vehicle deceleration
$z_{Ist}$ vehicle-actual-deceleration

The invention claimed is:

1. A method for regulating a vehicle deceleration in a vehicle with an ABS brake system, the method comprising:
    detecting the vehicle deceleration;
    determining a target deceleration;
    detecting a wheel rotational behavior that indicates a difference in a rotational behavior of a wheel of a first vehicle axle from a wheel of a further vehicle axle;
    calculating, for adjusting the vehicle deceleration to the target deceleration and the wheel rotational behavior to a target rotational behavior, actuation times for actuation of each of a first number of pressure control valves of the ABS brake system;
    determining at least one minimum actuation time undershoot resulting from at least one respective calculated actuation time being less than a respective corresponding minimum actuation time associated with the respective pressure control valve; and
    calculating, in response to the at least one minimum actuation time undershoot, correction actuation times for actuation of each of a second number of pressure control valves of the ABS system; and
    actuating, to bring about the target vehicle deceleration, each of the second number of pressure control valves of the ABS system according to the correction actuation times,
    wherein the second number is smaller than the first number.

2. The method as claimed in claim 1, wherein the pressure control valves of the second number of pressure control valves are a subset of the pressure control valves of the first number of pressure control valves.

3. The method as claimed in claim 1, wherein the target deceleration is determined from a target deceleration function that is linear with respect to time,
    wherein the target deceleration function is divided into multiple timing cycles,
    wherein a respective timing cycle target deceleration is determined for each respective timing cycle,
    wherein each respective timing cycle target deceleration is determined as a value of the target deceleration function at a respective point in time during the respective timing cycle, and
    wherein there is a waiting time between each of the multiple timing cycles.

4. The method as claimed in claim 3, wherein, for each timing cycle, respective correction actuation times are divided into approximately equal timing intervals, wherein each timing interval exceeds the corresponding respective minimum actuation time, and
    wherein the respective pressure control valve is successively actuated with the timing intervals to implement the correction actuation time.

5. The method as claimed in claim 1, wherein the determining at least one minimum actuation time undershoot comprises determining that all respective calculated actuation times for all of the respective first number of pressure control valves are less than respective corresponding minimum actuation times associated with the respective pressure control valves, and
    wherein the calculating, in response to the at least one minimum actuation time undershoot, correction actuation times for actuation of each of the second number of pressure control valves of the ABS system comprises determining a correction actuation time for a respective pressure control valve having a respective calculated actuation time that is closest to the respective corresponding minimum actuation time.

6. The method as claimed in claim 1, wherein the determining at least one minimum actuation time undershoot comprises determining that all respective calculated actuation times for all of the respective first number of pressure control valves are less than respective corresponding minimum actuation times associated with the respective pressure control valves, and
    wherein the calculating, in response to the at least one minimum actuation time undershoot, correction actuation times for actuation of each of the second number of pressure control valves of the ABS system does not include determining a correction actuation time for a respective pressure control valve having a respective calculated actuation time that differs most from the respective corresponding minimum actuation time,
    wherein the method further comprises:
        determining at least one minimum correction actuation time undershoot resulting from at least one respective correction actuation time for a respective pressure control valve being less than a respective corresponding minimum actuation time associated with the respective pressure control valve, and
        successively carrying out a recalculation of the correction actuation times without the respective correction actuation time that differs most from the respective corresponding minimum actuation time.

7. The method as claimed in claim 6, wherein successively carrying out the recalculation of the correction actuation times without the respective correction actuation time that differs most from the respective corresponding minimum actuation time results in only a single remaining pressure control valve being available for actuation,
    wherein the recalculation of the correction actuation time for the single remaining pressure control valve provides a recalculated correction actuation time for the single remaining pressure control valve that is less than the respective corresponding minimum actuation time of the single remaining pressure control valve,
    wherein the method further comprises carrying out actuation of the single remaining pressure control valve only if the recalculated correction actuation time for the single remaining pressure control valve is greater than or equal to the respective corresponding minimum actuation time after a variable waiting time between two timing cycles, the variable waiting time being divided into a minimum waiting time and at least one time interval.

8. The method as claimed in claim 1, further comprising:
    determining at least one minimum correction actuation time undershoot resulting from at least one respective correction actuation time for a respective pressure control valve being less than a respective corresponding minimum actuation time associated with the respective pressure control valve, and
    setting each of the at least one respective correction actuation time that is less than the respective corresponding minimum actuation time to the respective corresponding minimum actuation time.

9. The method as claimed in claim 1, wherein calculating, in response to the at least one minimum actuation time undershoot, correction actuation times for actuation of each of the second number of pressure control valves of the ABS system comprises calculating at least one or only one correction actuation time for each pressure control valve for which the calculated respective actuation time exceeds the corresponding respective minimum actuation time.

10. The method as claimed in claim 1, wherein actuation times are calculated for pressure control valves associated with all wheels of the vehicle that can be braked.

11. The method as claimed in claim 1, wherein each respective calculated actuation time indicates a time for which an inlet valve and/or an outlet valve of a respective pressure control valve of the ABS system is to be actuated,
    wherein each respective calculated correction actuation time indicates a time for which an inlet and/or an outlet valve of a respective pressure control valve of the ABS system is to be actuated,
    wherein an inlet valve minimum actuation time is associated with each respective inlet valve, and
    wherein an outlet valve minimum actuation time is associated with each respective outlet valve.

12. The method as claimed in claim 1, wherein the target vehicle deceleration is specified by a controller of a driver assistance system and/or by a driver via actuation of a brake valve.

13. The method as claimed in claim 1, wherein the wheel rotational behavior is a difference in a brake slip or a difference in an angular speed between the wheel of the first axle and the wheel of the further axle.

14. The method as claimed in claim 1, wherein the respective minimum actuation time for each respective pressure control valve is specified individually, and wherein the minimum actuation time for each respective pressure control valve is determined based on a temperature and/or the vehicle axle having the wheel with which the pressure control valve is associated.

15. The method as claimed in claim 1, wherein the target rotational behavior is dependent on the vehicle deceleration and/or the target vehicle deceleration.

16. A controller configured to carry out the method as claimed in claim 1 for regulating the vehicle deceleration in the vehicle with the ABS brake system.

17. A vehicle with an ABS brake system having a control unit as claimed in claim 16.

* * * * *